UNITED STATES PATENT OFFICE.

ARNOLD STEINER, OF BASEL, SWITZERLAND, ASSIGNOR TO THE CORPORATION OF CHEMICAL WORKS, FORMERLY SANDOZ, OF BASEL, SWITZERLAND.

GALLOCYANIN DYE AND PROCESS OF MAKING SAME.

No. 901,657.     Specification of Letters Patent.     Patented Oct. 20, 1908.

Application filed November 5, 1907. Serial No. 400,771.

*To all whom it may concern:*

Be it known that I, ARNOLD STEINER, doctor of philosophy, chemist, a citizen of the Swiss Republic, and resident of Basel, Switzerland, whose post-office address is 81 Socinstrasse, have invented new and useful Improvements in Gallocyanin Dyes and Processes of Making the Same, of which the following is a specification.

Some of the dyestuffs of the gallocyanin series have hitherto found a very limited use only for dyeing and printing purposes on account of their insufficient solubility. In order to obviate this inconvenience, it has been tried to render these coloring matters more soluble by the use of bisulfite or by transforming them into their soluble leuco-compounds.

Now I have found a very simple process for obtaining products of perfect solubility, by discovering that a leucogallocyanin in form of an acid salt as for instance the chlorinhydrate will easily dissolve an insoluble gallocyanin acid salt. A quantitative analysis has shown that not a simple solution, but the formation of distinct chemical compounds has taken place, one molecule of the leucogallocyanin acting upon one molecule of the gallocyanin, whereby a body results which seems to be a quinhydrone. Most of the new compounds are crystalline and are generally easily soluble in water with a violet coloration; their solution in concentrated sulfuric acid showing a blue coloration. According to the chemical nature of these compounds they are obtained after the following methods: 1. Partial reduction of a gallocyanin. 2. Partial oxidation of a leucogallocyanin. 3. Action of a leucogallocyanin on a gallocyanin. The last mentioned method is the most interesting, allowing the production of mixed combinations.

*Example 1—Partial reduction of gallocyanin.*—100 parts of gallocyanin from nitrosodimethylanilin and gallic acid are mixed as a finely divided paste with 500 parts of water and 50 parts of concentrated hydrochloric acid. During one hour 11 parts of zinc dust 85% (a quantity corresponding to half a molecule) are added in portions, while stirring. The gallocyanin enters soon into solution with an intense violet color; after one hour the small residue of undissolved gallocyanin is filtered off and the dyestuff is salted out and dried in the vacuum at a low temperature. The compound is obtained as a violet crystalline powder, readily soluble in water.

*Example 2—Partial oxidation of a leucogallocyanin.*—Into a neutral solution of 10 kilos of chlorinhydrate of leucogallocyanin in 100 liters of water, 3,.4 kilos persulfate of ammonia, dissolved in water are introduced (corresponding to half a molecule of oxygen). The oxidation takes place at once without precipitation of gallocyanin. The violet solution is salted out and the dyestuff is filtered off; it is a crystalline powder. In this example the persulfate of ammonia may be replaced by an equivalent quantity of any other oxidizing agent, as for instance ferric salts, chromic acid etc.

*Example 3—Action of a leucogallocyanin on a gallocyanin.*—10 kilos of chlorinhydrate of leucogallocyanin are brought into a paste with 30 liters of water, 10 kilos of chlorinhydrate of gallocyanin are added and the whole is heated for several hours on the water bath at about 50° C., while continuously stirring. The gallocyanin is rapidly dissolved and finally a syrup like mass is obtained which is easily soluble in water and can be used for printing purposes.

For isolating the coloring matter it is sufficient to salt it out with common salt from the solution and to filter and to dry it in the vacuum at a low temperature.

The following examples illustrate the application of my process for the production of mixed combinations. There is a considerable number of them, any known gallocyanin being adapted to be combined with all the leucogallocyanins and any leucogallocyanin with all the known gallocyanins. I shall mention here only a few typical cases.

*Example 4—Leucogallocyanin and prune.*— 10 kilos of prune pure (gallocyanin from nitrosodimethylanilin and gallic acid methylether) are dissolved in 100 liters of water and precipitated completely by adding 5 kilos hydrochloric acid. To the crystalline paste thus obtained 10 kilos leucogallocyanin chlorinhydrate are added. After a short time the solution becomes complete. The red violet liquid is salted out, the coloring matter separates in the shape of a thick oil, which soon solidifies into a crystalline mass. It is readily soluble and melts on the water bath in the presence of a small quantity of water.

*Example 5—Leucogallocyanin and gallamin blue.*—10 kilos leucogallocyanin chlorinhydrate are mixed with 10 kilos gallamin blue (insoluble gallocyanin from nitrosodimethylanilin and gallaminic acid) and 20 liters of water. The thick paste is heated in a closed vessel for some hours on the water bath at 50° C. It becomes soon liquid and gives a dark violet solution, which thickens step by step and becomes a crystalline mass, soluble in hot water. When in this example the gallamin blue is replaced by coelestin blue (gallocyanin from nitrosodiethylanilin and gallaminic acid) analogous products are obtained which however are of much better solubility.

*Example 6—Leucogallamin blue and gallamin blue.*—10 kilos of gallamin blue, reduced with zinc dust and hydrochloric acid, or 25 kilos of the commercial product, that is to say a paste of 40% are diluted to about 60 kilos. 10 kilos gallamin blue are added and the mass is stirred for some hours on the water bath. The mass is first rather liquid and takes soon a dark violet coloration. After a short time it thickens and becomes a green crystalline paste, little soluble in water. It is allowed to cool, washed thoroughly and dried. The yield is 19 kilos. When in this example the gallamin blue is replaced by coelestin blue or prune, products are obtained which are soluble in cold water. If the leucogallamin-blue is replaced by leucocoelestin blue and combined with gallocyanin or with gallamin blue, which are both insoluble, products are obtained which are readily soluble in cold water and which can only be precipitated by complete saturation with common salt. They separate in the shape of a thick oil which becomes crystalline step by step.

*Example 7—Leucoderivative of gallocyanin from pyrogallol and corresponding coloring matter.*—The process for making these two products is described in the British patent application No. 6951 dated March 22nd 1907. The compounds obtained in combining this leucoproduct with insoluble gallocyanins are readily soluble in cold water and possess similar properties as those from the leucoproduct of coelestin-blue. The method is the same as in the preceding examples.

The combination of gallocyanin from pyrogallol with its leucoderivative may also be made in the following manner. The product obtained as per Example 1, 2 and 3 of the present application is heated in a neutral or weakly acid solution during a few hours at 80–90° until no more carbonic acid is set free. The violet solution is precipitated with salt and the coloring matter thus obtained forms a crystalline powder of dark color, dissolving in cold water with a violet shade.

Now what I claim and desire to secure by Letters Patent is the following:

1. The process of manufacturing new coloring matters of the gallocyanin series which consists in combining a leucogallocyanin with a gallocyanin substantially as described.

2. The process of manufacturing new coloring matters of the gallocyanin series which consists in combining one molecule of a leucogallocyanin with one molecule of a gallocyanin substantially as described.

3. The process of manufacturing new coloring matters of the gallocyanin series which consists in combining one molecule of leucogallocyanin chlorinhydrate with one molecule of gallocyanin substantially as described.

4. The new dyestuffs of the gallocyanin series which are obtained by combining a leucogallocyanin with a gallocyanin, being when dried and pulverized dark violet powders soluble in water with a violet bluish color, soluble in strong sulfuric acid with a blue color turning red on addition of water and giving on addition of sodium acetate, a violet precipitate, the said dyestuffs dyeing violet on fibers mordanted with chromium, substantially as described.

In testimony, that I claim the foregoing as my invention, I have signed my name in presence of two witnesses, this 19th day of October 1907.

ARNOLD STEINER.

Witnesses:
MELCHIOR BONIGER,
WERNER HAUFFACHER